(12) United States Patent
Lu

(10) Patent No.: US 9,153,918 B2
(45) Date of Patent: Oct. 6, 2015

(54) POWER INSERTER HAVING FREQUENCY COMPENSATING FUNCTION

(71) Applicant: Shan-Jui Lu, Xizhi (TW)

(72) Inventor: Shan-Jui Lu, Xizhi (TW)

(73) Assignee: LANTEK ELECTRONICS, INC., Xizhi (TW)

( * ) Notice: Subject to any disclaimer, the term of this patent is extended or adjusted under 35 U.S.C. 154(b) by 0 days.

(21) Appl. No.: 14/215,529

(22) Filed: Mar. 17, 2014

(65) Prior Publication Data

US 2014/0273635 A1 Sep. 18, 2014

Related U.S. Application Data

(60) Provisional application No. 61/789,008, filed on Mar. 15, 2013.

(51) Int. Cl.
*H01R 13/66* (2006.01)
*H01R 24/42* (2011.01)
*H01R 24/54* (2011.01)
*H04B 3/44* (2006.01)

(52) U.S. Cl.
CPC ................ *H01R 24/42* (2013.01); *H01R 24/54* (2013.01); *H04B 3/44* (2013.01)

(58) Field of Classification Search
CPC ............. H01R 13/719; H01R 13/6633; H01R 13/6625; H01R 13/6464; H01R 13/7032
See application file for complete search history.

(56) References Cited

U.S. PATENT DOCUMENTS 5,833,496 A * 11/1998 Hollander et al. ........ 439/620.05
7,701,309 B2 * 4/2010 Shapson ..................... 333/24 R
7,878,856 B2 * 2/2011 Yamashita ............... 439/620.21
8,331,108 B2 * 12/2012 Lu ................................ 361/811

* cited by examiner

*Primary Examiner* — Xuong Chung Trans
(74) *Attorney, Agent, or Firm* — Law Offices of Eugene M. Cummings, P.C.

(57) ABSTRACT

The present invention relates to a power inserter having frequency compensating function, which comprises: a housing formed with a chamber, a first opening, a second opening and a third opening; a first connector exposed outside the housing through the first opening; a second connector exposed outside the housing through the second opening; a third connector exposed outside the housing through the third opening; and characterized in that: a capacitor is further provided, a first terminal of the capacitor is formed with a winding having at least half turn and coupled to a signal terminal of the third connector, a second terminal of the capacitor is formed with a winding having at least half turn and coupled to a signal terminal of the second connector, thereby being enabled to provide the frequency compensating function.

7 Claims, 6 Drawing Sheets

POWER INSERTER HAVING FREQUENCY COMPENSATING FUNCTION

CROSS-REFERENCE TO RELATED APPLICATIONS

This application claims benefit under 35 U.S.C. §119(e) of U.S. Provisional Application Ser. No. 61/789,008, entitled "POWER INSERTER HAVING FREQUENCY COMPENSATING FUNCTION," filed Mar. 15, 2013, naming Shan-Jui Lu as the inventor, the complete disclosure being incorporated herein by reference.

BACKGROUND OF THE INVENTION

1. Field of the Invention

The present invention relates to a power inserter having a frequency compensating function, and specifically to a power inserter having a frequency compensating function in which a capacitor is installed between a power output and radio frequency (RF) signal input connector and a RF signal output connector. Two terminals of the capacitor are respectively formed with a winding having at least half turn.

2. Description of Related Art

A conventional power inserter is often installed with a power input connector, a RF signal input connector and a power and RF signal output connector. The power input connector is generally used for receiving electric power, the RF signal input connector is generally used for receiving RF signals, the power and RF signal output connector is used for mixing the power and the RF signals to be transmitted, and a capacitor is generally coupled between the RF signal input connector and the power and RF signal output connector, thereby providing a simple frequency compensating function.

Please refer from FIG. 1(a) to FIG. 1(c), wherein FIG. 1(a) is a schematic view illustrating the return loss of the power output and RF signal input connector of a conventional power inserter; FIG. 1(b) is a schematic view illustrating the return loss of the RF signal output connector of a conventional power inserter; and FIG. 1(c) is a schematic view illustrating the transmission loss between the power output and RF signal input connector and the RF signal output connector of a conventional power inserter. As shown in FIG. 1(b), the RF signal output connector of a conventional power inserter has a return loss of −50 dB between the location of ∇2 and ∇3, wherein the value of ∇1 to ∇3 has to be below a third limit line. The return loss is only −5 to −7 dB between the location of ∇4 and ∇5, wherein the value of the ∇4 and ∇5 has to be below a fourth limit line. Moreover, as shown in FIG. 1(c), the transmission loss of the conventional power inserter gradually gets higher from the location of ∇2, and even reaches to −1.7403 dB at the location of ∇5, such condition would seriously affect the RF signal transmission quality, wherein the value of ∇1 to ∇3 has to be above a fifth limit line, the value of ∇4 and ∇5 has to be above a sixth limit line.

In view of the mentioned shortage of the conventional power inserter, the present invention provides a power inserter having frequency compensating function for improvement.

SUMMARY OF THE INVENTION

One primary objective of the present invention is to provide a power inserter having frequency compensating function in which a capacitor is installed between a power output and RF signal input connector and a RF signal output connector. Two terminals of the capacitor are respectively formed with a winding having at least half turn, thereby providing the frequency compensating function.

For achieving aforesaid objective, the present invention provides a power inserter having a frequency compensating function, which comprises: a housing formed with a chamber, a first opening, a second opening and a third opening; a first connector exposed outside the housing through the first opening; a second connector exposed outside the housing through the second opening; a third connector exposed outside the housing through the third opening; a first capacitor having a first terminal coupled to a signal terminal of the first connector and having a second terminal coupled to the ground potential; a first coil having a first terminal coupled to the first terminal of the first capacitor; a second capacitor having a first terminal coupled to a second terminal of the first coil and having a second terminal coupled to the ground potential; a second coil having a first terminal coupled to the second terminal of the first coil and having a second terminal coupled to a signal terminal of the third connector, and characterized in that: a third capacitor is further provided, a first terminal of the third capacitor is formed with a winding having at least half turn and coupled to the signal terminal of the third connector, a second terminal of the third capacitor is formed with a winding having at least half turn and coupled to a signal terminal of the second connector, thereby being enabled to provide the frequency compensating function.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 2:
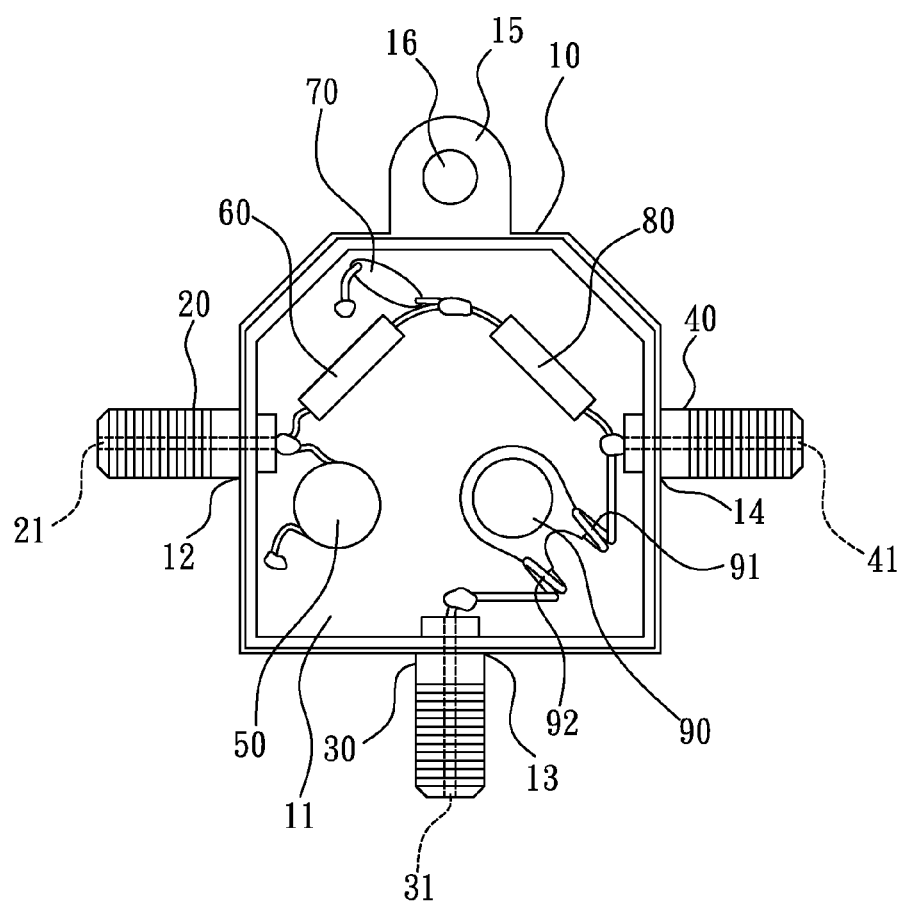
FIG. 2 is a schematic view illustrating the assembly of the power inserter having a frequency compensating function, according to one preferred embodiment of the present invention.
Figure 3:
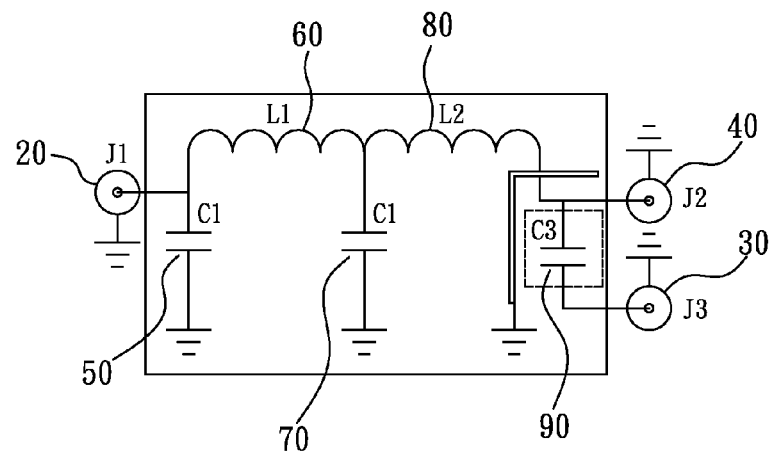
FIG. 3 is a block diagram illustrating the power inserter having frequency compensating function, according to one preferred embodiment of the present invention.
Figure 4:
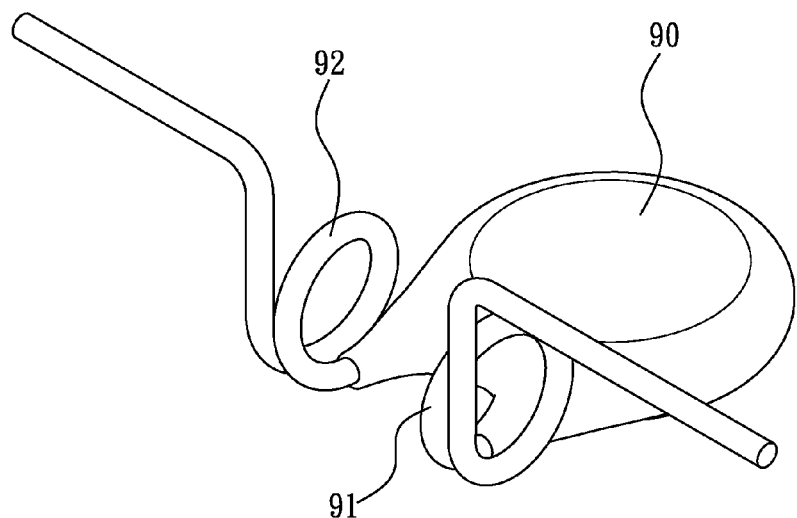
FIG. 4 is a schematic enlarged view illustrating two terminals of the third capacitor being respectively formed with a winding, according to one preferred embodiment of the present invention.
Figure 5A:
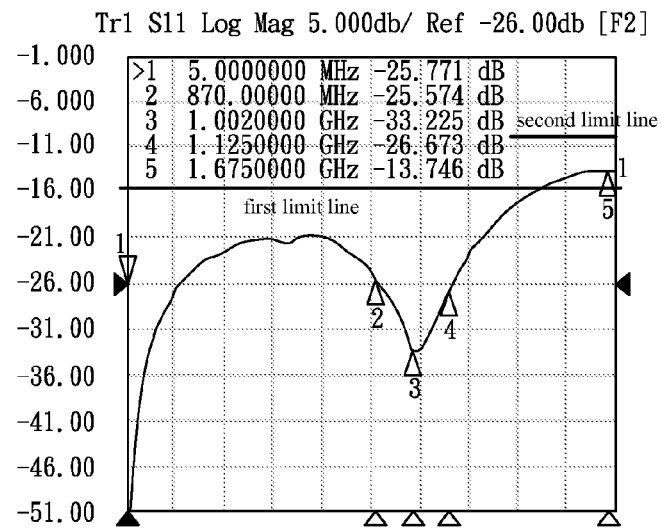
FIG. 5(a) is a schematic view illustrating the return loss of the power output and RF signal input connector of the power inserter having a frequency compensating function, according to one preferred embodiment of the present invention.
Figure 5B:
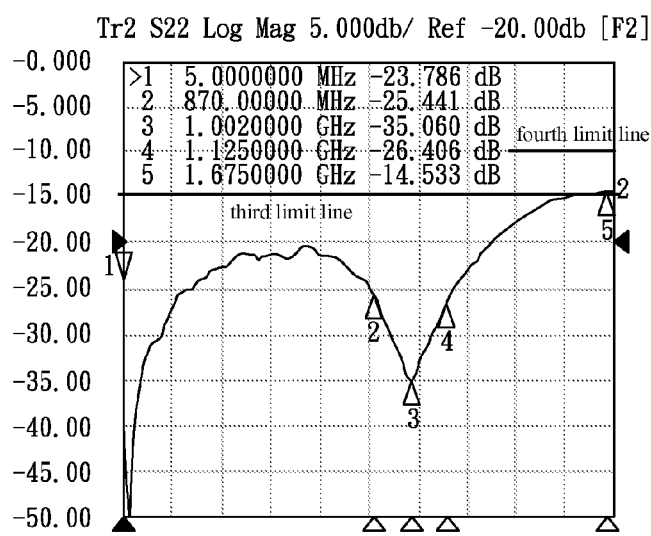
FIG. 5(b) is a schematic view illustrating the return loss of the RF signal output connector of the power inserter having a frequency compensating function, according to one preferred embodiment of the present invention.
Figure 5C:
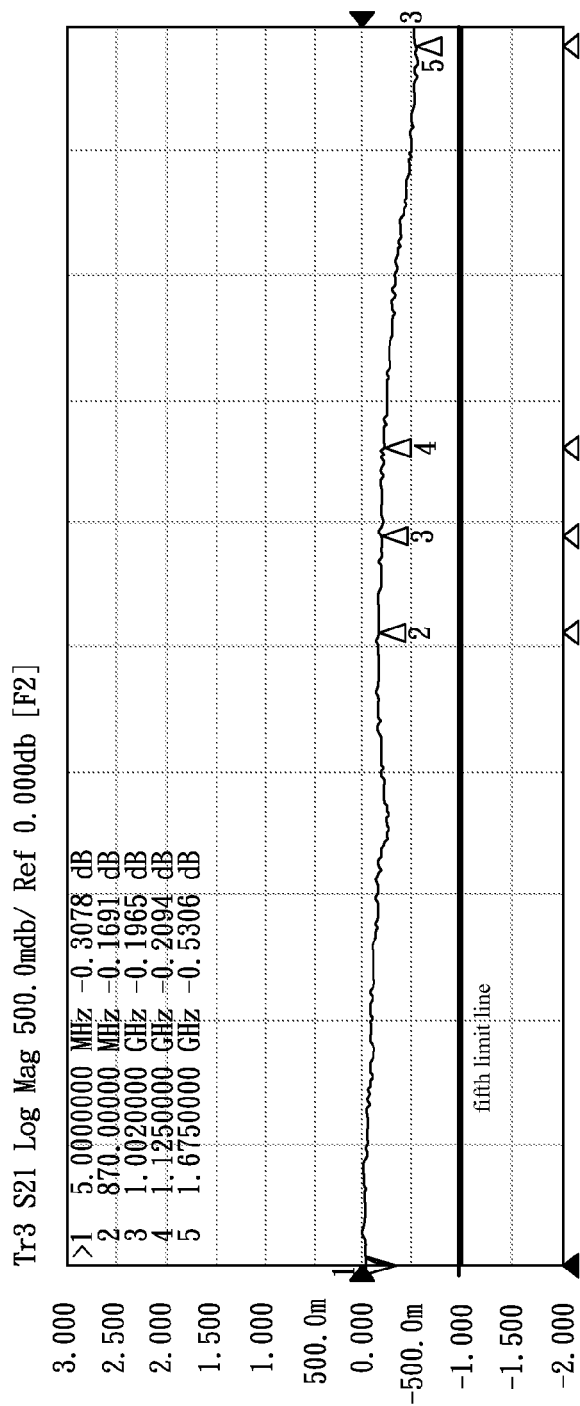
FIG. 5(c) is a schematic view illustrating the transmission loss between the power output and RF signal input connector and the RF signal output connector of the power inserter having a frequency compensating function, according to one preferred embodiment of the present invention.

Please refer from FIG. 2 to FIG. 5(c), wherein FIG. 2 is a schematic view illustrating the assembly of the power inserter having a frequency compensating function, according to one preferred embodiment of the present invention; FIG. 3 is a block diagram illustrating the power inserter having a frequency compensating function, according to one preferred embodiment of the present invention; FIG. 4 is a schematic enlarged view illustrating two terminals of the third capacitor being respectively formed with a winding, according to one preferred embodiment of the present invention; FIG. 5(a) is a schematic view illustrating the return loss of the power output and RF signal input connector of the power inserter having a frequency compensating function, according to one preferred embodiment of the present invention; FIG. 5(b) is a schematic view illustrating the return loss of the RF signal output connector of the power inserter having a frequency compensating function, according to one preferred embodiment of the present invention; and FIG. 5(c) is a schematic view illustrating the transmission loss between the power output and RF signal input connector and the RF signal output connector of the power inserter having a frequency compensating function, according to one preferred embodiment of the present invention.

As shown in FIG. 2, the power inserter having a frequency compensating function provided by the present invention comprises a housing 10, a first connector 20, a second connector 30, a third connector 40, a first capacitor 50, a first coil 60, a second capacitor 70, a second coil 80 and a third capacitor 90. The coils 60 and 80 may be in the form of a wire coil, air coil, inductive coil, or the like.

The housing 10 may be constructed of a suitable material (e.g. metal, including but not limited to aluminum), and is formed with a chamber 11. The housing 10 is further formed with a first opening 12, a second opening 13 and a third opening 14.

The first connector 20 is exposed outside the housing 10 through the first opening 12. The first connector 20 may be, for example, but not limited to, a power input connector which is used for inputting electric power to the power inserter.

The second connector 30 is exposed outside the housing 10 through the second opening 13. The second connector 30 may be for example, but not limited to, a RF signal output connector which is used for outputting RF signals to a television unit (not shown in figures).

The third connector 40 is exposed outside the housing 10 through the third opening 14. The third connector 40 may be for example, but not limited to, a RF signal input or power output connector which is used for inputting RF signals from a signal amplifier (not shown in figures) to the power inserter, then outputting electric power to the signal amplifier.

A first terminal of the first capacitor 50 is coupled to a signal terminal 21 of the first connector 20, and a second terminal thereof is coupled to the ground potential.

A first terminal of the first coil 60 is coupled to the first terminal of the first capacitor 50.

A first terminal of the second capacitor 70 is coupled to a second terminal of the first coil 60, the second terminal thereof is coupled to the ground potential. Wherein, the first capacitor 50 and the second capacitor 70 are used for filtering noise in the power signals.

A first terminal of the second coil 80 is coupled to the second terminal of the first coil 60, the second terminal thereof is coupled to a signal terminal 41 of the third connector 40. Wherein, the first coil 60 and the second coil 80 are used for connecting the power signals to the third connector 40.

A first terminal of the third capacitor 90 is formed with a first winding 91 having at least half turn and coupled to the signal terminal 41 of the third connector 40, a second terminal of the third capacitor 90 is formed with a second winding 92 having at least half turn and coupled to a signal terminal 31 of the second connector 30, thereby being enabled to provide a frequency compensating function. Wherein, the number of turns and the diameter of the first winding 91 and the second winding 92 are relative to the capacitance of the third capacitor 90 and the distance between the second connector 30 and the third connector 40. According to this embodiment, the number of turns of the first winding 91 and the second winding 92 is 1.5 turns, which only serves as an example for illustration and shall not be deemed as a limitation to the scope of the present invention.

In addition, according to the power inserter having frequency compensating function provided by the present invention, the housing 10 is further installed with a fasten sheet 15 on which a fasten hole 16 is formed, thereby enabling the power inserter to be fastened on an object, e.g. but not limited to being fastened on a wall.

Figure 1A:
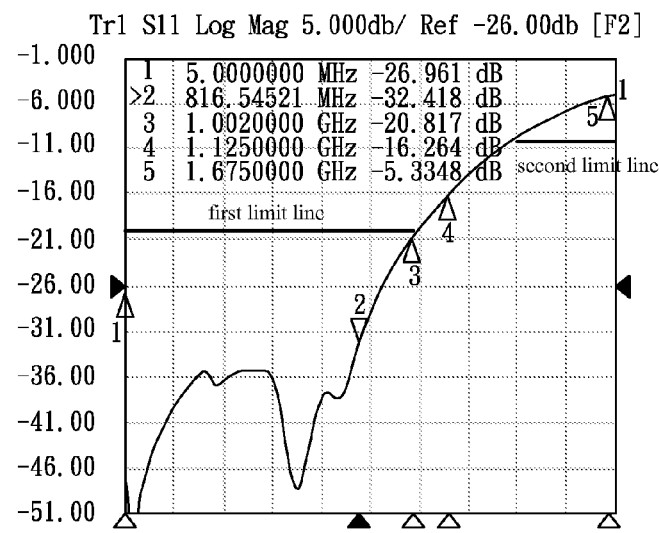
FIG. 1(a) is a schematic view illustrating the return loss of the power output and RF signal input connector of a conventional power inserter.

After the third capacitor 90 having the first winding 91 and the second winding 92 IS connected to the second connector 30 and the third connector 40, as shown in FIG. 5(a), the second connector 30 of the present invention has a return loss of −33.225 dB, −26.673 dB and −13.746 dB respectively at the location of ∇3, ∇4 and ∇5, wherein the value of ∇1 to ∇3 has to be below a first limit line, the value of ∇4 and ∇5 has to be below a second limit line. Compared to what is shown in FIG. 1(a), the power output and RF signal input connector of the conventional power inserter has a return loss of −20.817 dB, −16.264 dB, −5.3348 dB respectively at the location of ∇3, ∇4 and ∇5. As such, the second connector 30 of the present invention has greater return loss, thereby enhancing the matching degree.

Figure 1B:
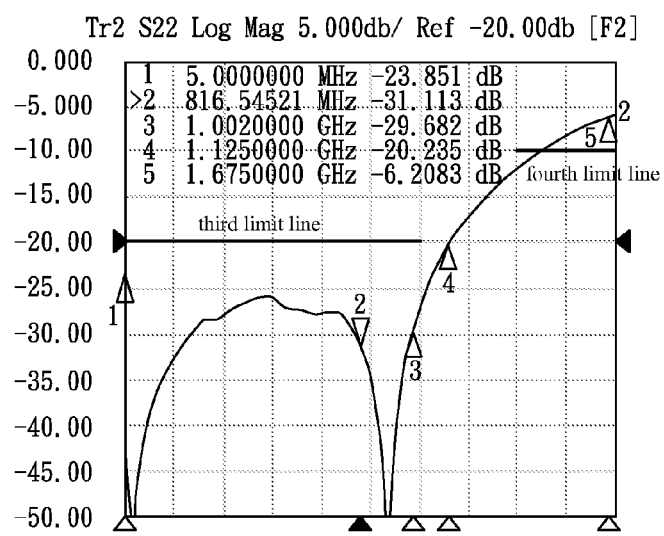
FIG. 1(b) is a schematic view illustrating the return loss of the RF signal output connector of a conventional power inserter.

As shown in FIG. 5(b), the third connector 40 of the present invention has a return loss of −35.060 dB, −26.406 dB and −14.533 dB respectively at the location of ∇3, ∇4 and ∇5, wherein the value of ∇1 to ∇3 has to be below a third limit line, the value of ∇4 and ∇5 has to be below a fourth limit line. Compared to what is shown in FIG. 1(b), the RF signal output connector of the conventional power inserter has a return loss of −29.682 dB, −20.235 dB and −6.2083 dB respectively at the location of ∇3, ∇4 and ∇5, as such, the third connector 40 of the present invention has greater return loss, thereby enhancing the mating degree.

Figure 1C:
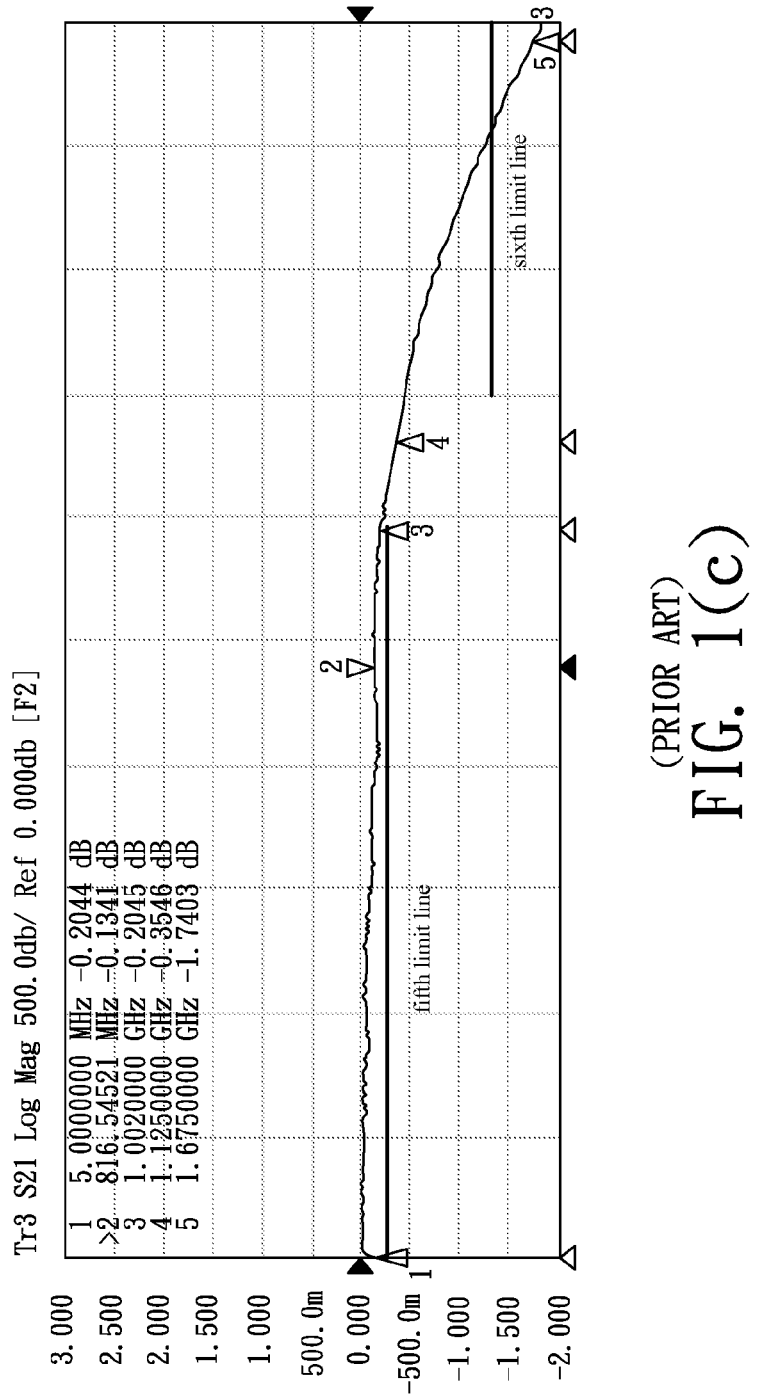
FIG. 1(c) is a schematic view illustrating the transmission loss between the power output and RF signal input connector and the RF signal output connector of a conventional power inserter.

As shown in FIG. 5(c), the transmission loss between the second connector 30 and the third connector 40 of the present invention is −0.1965 dB, −0.2094 dB and −0.5306 dB respectively at the location of ∇3, ∇4 and ∇5, wherein the value of ∇1 to ∇5 has to be above a fifth limit line. Compared to what is shown in FIG. 1(c), the transmission loss between the power output and RF signal input connector and the RF signal output connector of the conventional power inserter is −0.2045 dB, −0.3546 dB and −1.7403 dB respectively at the location of ∇3, ∇4 and ∇5. As such, the transmission loss between the second connector 30 and the third connector 40 of the present invention is smaller. As such, the installation of the first winding 91 and the second winding 92 provided by the present invention can effectively improve the return loss and the transmission loss of the conventional power inserter and the frequency compensating function is also provided. Accordingly, the power inserter having frequency compensating function provided by the present invention is novel comparing to the conventional power inserter.

As what has been disclosed above, with the practice of the power inserter having a frequency compensating function provided by the present invention, a capacitor is installed between the RF signal output connector and the power output and RF signal input connector, and two terminals of the capacitor are respectively formed with a winding having at least half turn, thereby being capable of reducing the return loss and the transmission loss and providing the frequency compensating function. As such, the power inserter having frequency compensating function of the present invention is more practical comparing to the conventional power inserter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A power inserter having frequency compensating function, comprising:
    a housing formed with a chamber, a first opening, a second opening and a third opening;
    a first connector exposed outside said housing through said first opening;
    a second connector exposed outside said housing through said second opening;
    a third connector exposed outside said housing through said third opening;
    a first capacitor having a first terminal coupled to a signal terminal of said first connector and having a second terminal coupled to the ground potential;
    a first coil having a first terminal coupled to said first terminal of said first capacitor;
    a second capacitor having a first terminal coupled to a second terminal of said first coil and having a second terminal coupled to the ground potential; and
    a second coil having a first terminal coupled to said second terminal of said first coil and having a second terminal coupled to a signal terminal of said third connector;
    characterized in that: a third capacitor being further provided, a first terminal of said third capacitor being formed with a winding having at least half turn and coupled to said signal terminal of said third connector, a second terminal of said third capacitor being formed with a winding having at least half turn and coupled to a signal terminal of said second connector, thereby being enabled to provide the frequency compensating function.

2. The power inserter having frequency compensating function as claimed in claim 1, wherein said housing is a metal housing.

3. The power inserter having frequency compensating function as claimed in claim 1, wherein said first connector is a power input connector.

4. The power inserter having frequency compensating function as claimed in claim 1, wherein said second connector is a RF signal output connector.

5. The power inserter having frequency compensating function as claimed in claim 1, wherein said third connector is a power output and RF signal input connector.

6. The power inserter having frequency compensating function as claimed in claim 1, wherein said housing is further installed with a fasten sheet on which a fasten hole is formed.

7. The power inserter having frequency compensating function as claimed in claim 1, wherein the number of turns and the diameter of said first winding and said second winding are relative to the capacitance of said third capacitor and the distance between said second connector and said third connector.

* * * * *